US008449229B2

(12) United States Patent
Brown et al.

(10) Patent No.: US 8,449,229 B2
(45) Date of Patent: May 28, 2013

(54) FABRICATION ON OF AN ALTERNATE SCAVENGER GEOMETRY

(75) Inventors: Kenneth J. Brown, Penfield, NY (US); Michael T. Dobbertin, Honeoye, NY (US); Dennis J. Grabb, Sodus, NY (US)

(73) Assignee: Eastman Kodak Company, Rochester, NY (US)

( * ) Notice: Subject to any disclaimer, the term of this patent is extended or adjusted under 35 U.S.C. 154(b) by 525 days.

(21) Appl. No.: 12/827,305

(22) Filed: Jun. 30, 2010

(65) Prior Publication Data

US 2012/0000332 A1 Jan. 5, 2012

(51) Int. Cl.
*B23C 3/00* (2006.01)

(52) U.S. Cl.
USPC ........... 409/132; 409/143; 399/273; 399/343; 399/264; 451/28; 83/13

(58) Field of Classification Search
USPC .................. 409/131–132, 143; 451/190, 194, 451/197, 28, 178; 399/273, 283, 343, 149, 399/150, 264; 83/13, 676
See application file for complete search history.

(56) References Cited

U.S. PATENT DOCUMENTS 1,241,294 A * 9/1917 Smith ............................. 83/877
3,587,150 A * 6/1971 Menard ........................... 407/45
5,047,807 A 9/1991 Kalyandurg
5,640,651 A * 6/1997 Katoh et al. .................. 399/119
6,601,484 B1 * 8/2003 Katoh et al. ................... 82/1.11
6,810,183 B2 10/2004 Marion
7,306,412 B2 * 12/2007 Masuyama ................... 409/132
7,347,652 B2 * 3/2008 Giovanelli et al. ........... 409/132
7,983,604 B2 * 7/2011 Brown et al. ................. 399/264
8,351,828 B2 * 1/2013 Brown et al. ................. 399/273
2006/0024100 A1 2/2006 Ohta et al.
2006/0257175 A1 11/2006 Endo et al.
2008/0092356 A1 * 4/2008 Fuhst et al. .................... 29/56.5
2009/0097893 A1 4/2009 Kiuchi et al.
2009/0136267 A1 5/2009 Brown et al.
2009/0158741 A1 6/2009 Wieres et al.
2009/0191368 A1 7/2009 Hironaga et al.
2011/0158702 A1 * 6/2011 Brown et al. ................. 399/273
2012/0070198 A1 * 3/2012 Brown et al. ................. 399/273
2012/0070199 A1 * 3/2012 Brown et al. ................. 399/273

FOREIGN PATENT DOCUMENTS

JP 56-144472 10/1981
JP 07-175328 A * 7/1995

* cited by examiner

*Primary Examiner* — Erica E Cadugan
(74) *Attorney, Agent, or Firm* — Eugene I. Shkurko; Amit Singhal

(57) ABSTRACT

A method of making a slotted scavenger wherein a rigid sheet is used as a starting material. A slot is formed through the sheet having horizontally angled sidewalls such that an opening of the slot on a first major surface of the sheet is smaller than an opening of the slot in a second major surface of the sheet. Modifications of the method include using a rotating cutting tool for cutting through the sheet to form slots.

15 Claims, 8 Drawing Sheets

FABRICATION ON OF AN ALTERNATE SCAVENGER GEOMETRY

CROSS REFERENCE TO RELATED APPLICATIONS

Reference is made to commonly-assigned copending U.S. patent application Ser. No. 12/827,261, filed of even date herewith entitled, "Printer Having An Alternate Scavenger Geometry" by Brown et al., the disclosure of which is incorporated herein by reference in its entirety.

FIELD OF THE INVENTION

The present invention pertains to electrographic printers and copiers utilizing developer comprising toner, carrier, and other components.

BACKGROUND OF THE INVENTION

Electrographic printers and copiers utilizing developer comprising toner, carrier, and other components use a developer mixing apparatus and related processes for mixing the developer and toner used during the printing process. As is well known, the carrier can comprise permanently magnetized ferrite core particles, dispersed in a developer station with toner, whereupon the toner is attracted to and is "carried" by the ferrite core to an imaging roller for printing on a print medium. The gram weight of the carrier can be approximately 6-8% of the toner, which together comprises the developer. As part of this process, the carrier is intended to be reused and recirculated within the developer station. Certain conditions will cause the carrier to leave the developer station and deposit on the surface of the imaging member. Typically, there exists an electrically biased electrode 103 (the scavenger electrode), as shown in FIG. 1, that urges this carrier off the surface of the imaging member 102 because the biasing induces magnetism in the electrode, whereupon the magnetic force of the development roller 101 will direct the carrier, under gravity, back into the development station substantially in the general direction 105. The scavenger is electrically biased via a combination of high frequency AC imposed on a DC waveform whose function is to provide the motive force for the movement of carrier off of the photoconductor surface. Under the alternating AC field, the carrier rocks free and breaks from the photoconductor surface. The magnetic field from the rotating core magnet then pulls the carrier particle through the slotted scavenger back into the developer station There are conditions, however, that result in the release of the carrier from the imaging (photoconductor) member 102, but the trajectory of the carrier is such that it will overshoot the trailing edge of the electrode 103. This can result in carrier accumulating, shown as 204 in FIG. 2, on the outside vertical face of the scavenger electrode 203 or other surfaces, such as on the outer surfaces of the developer station or other surfaces in the imaging engine. Since this carrier is intended to be reused within the developer station, the loss of carrier can result in degradation of the image due to compromised mixing in developer sump. This carrier loss can also accumulate to the point where this carrier mass 204 can make contact with the imaging member 202, thereby physically disrupting the image, resulting in a loss of image quality.

SUMMARY OF THE INVENTION

The primary issues solved by the present invention include, first, defining and fabricating a geometry of the scavenger that allows carrier to be returned to the developer station in the circumstance that the carrier has been successfully scavenged off of the surface of the imaging member and has a trajectory that overshoots the trailing edge of the scavenger electrode. Second, defining and fabricating a scavenger geometry such that carrier buildup on the vertical face is minimized. Third, defining and fabricating a scavenger geometry that preserves stiffness (moment of inertia) in both x-x and y-y planes, such that the requirement for straightness of the leading edge of the electrode (about 0.004" deflection over a length of about 14.5") can be maintained and, fourth, defining a scavenger geometry that facilitates economical production.

Such advantages are realized in a preferred embodiment of the present invention comprising a method of making a slotted scavenger wherein a rigid sheet is used as a starting material. A slot is formed through the sheet having horizontally angled sidewalls such that an opening of the slot on a first major surface of the sheet is smaller than an opening of the slot in a second major surface of the sheet. Modifications of the method include using a rotating cutting tool for cutting through the sheet and forming the slot or slots. A force is applied to the cutting tool at an angle normal to a first major surface of the rigid sheet for penetrating the rigid sheet and forming a rectangular opening in a second major surface of the sheet. Alternatively, a force is applied to the cutting tool at a vertical angle, in relation to a normal, to the first major surface of the rigid sheet, the angle formed anywhere between) and 45. The sheet typically comprises aluminum having a thickness of at least about 3 mm. Typical cutting tools will have an axis of rotation of, say, a cutting tool spindle, that is parallel to the sheet. Additional slots or openings are formed through the sheet resulting in a plurality of openings separated by an inter slot web having a cycloidal cross section. Trapezoidal cross sections are also an option.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

DETAILED DESCRIPTION OF THE INVENTION

Figure 1:
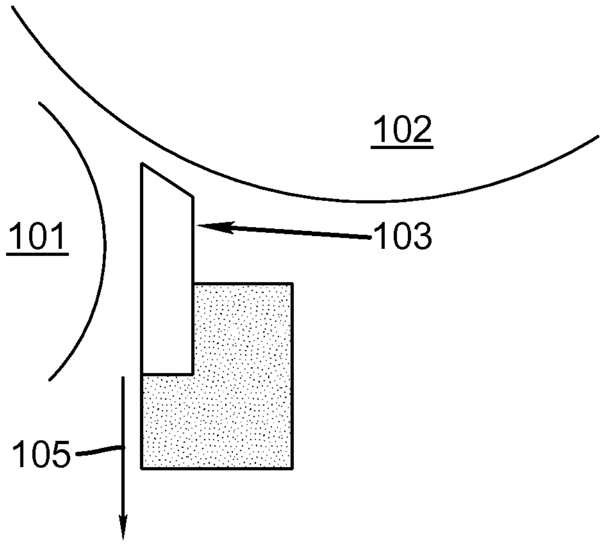
FIG. 1: Depiction of carrier scavenger electrode and electrostatographic module components.
Figure 2:
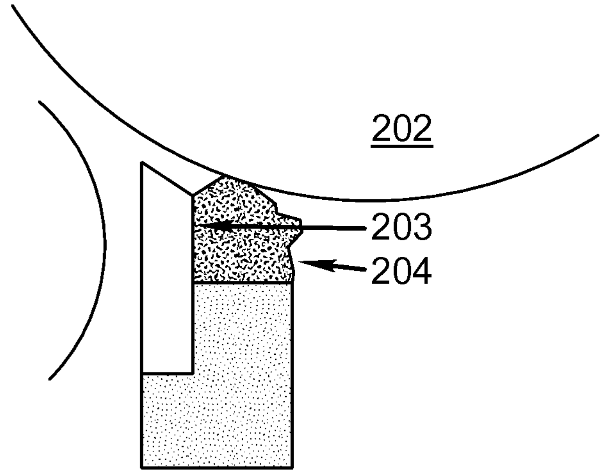
FIG. 2: Scavenger electrode showing carrier buildup.
Figure 3:
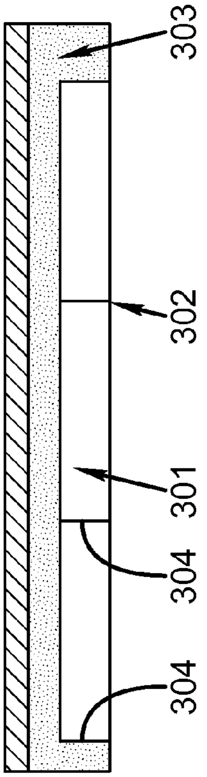
FIG. 3: Depiction of horizontal slots cut into vertical face of the scavenger electrode.

A preferred embodiment of the present invention provides return of carrier back into a printer's developer station by forming horizontal slots (separated by inter slot webs) through the vertical face of the scavenger electrode, as illustrated in FIG. 3 which shows a front view of the scavenger electrode as seen while looking at the outside vertical face 303. A preferred embodiment of these slots 301, having sidewalls 304, formed through the scavenger electrode comprise slots defined as follows:

Slot (sidewall) height: range from 3.2 mm to 5.5 mm, or 36% to 61% of the vertical face height of the Scavenger Electrode (approx. 9 mm vertical wall height). The interior and exterior vertical faces of the slots can be referred to as sidewalls.

Slot Width: range of 20 mm-30 mm.

Total slot area is 20%-30% of the total area of the inside vertical face of the scavenger electrode. Carrier buildup on the outside vertical face of the scavenger electrode is minimized by reducing the projected area of the inter slot web 302 on the outside vertical face. Scavenger stiffness is increased by maximizing the projected area of the inter slot web's inside vertical face of the scavenger electrode, as will be explained.

Figure 4B:
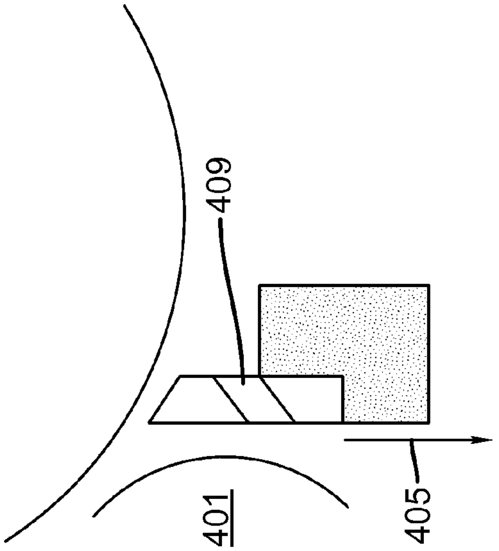
FIGS. 4A-B: Depiction of inside and outside vertical surfaces of the scavenger electrode and slot form options.
Figure 4A:
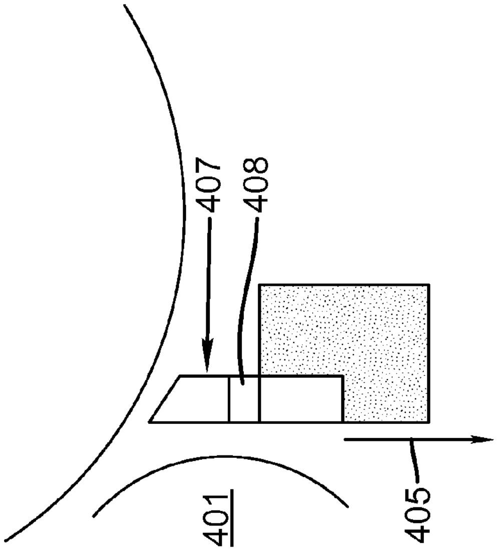
Figure 5:
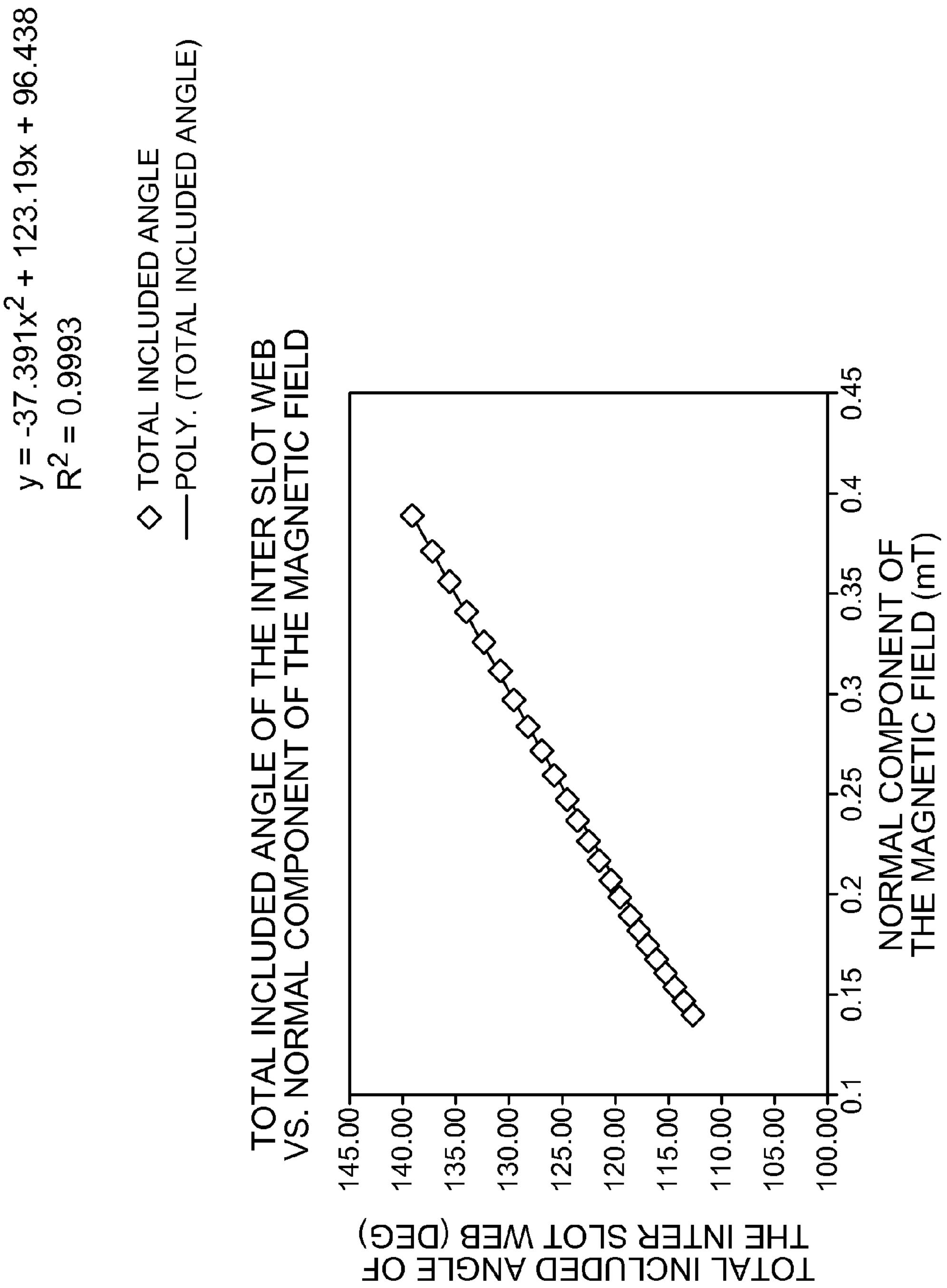
FIG. 5: Graph of inter slot web angle vs. magnetic field.

Referring to FIG. 4A, buildup of carrier on the outside vertical face 407 of the scavenger electrode is minimized when the total included angle of the inter slot web is proportional to the normal component of the magnetic field imposed by the development roller 401 on the built up carrier. This draws the carrier along a pathway from where the carrier accumulates 204 through the slots 408 which is then returned by earth gravitational force in direction 405 back to the developer station. An optional slot configuration is illustrated in FIG. 4B wherein the slot 409 is angled downward which requires less attractive force from the magnetic field provided by the development roller 401 to move the carrier out of the scavenger in the direction 405. This is due to gravity acting on the carrier and causing the carrier to travel through the slot. The magnetic field imposed by the development roller 401 is sufficiently described, with $R^2$=99.93%, per the following equation, supported by data shown in FIG. 5.

$$TIA = -37.391 \times FIELD^2 + 123.91 \times FIELD + 96.438,$$

where

TIA=Total Included Angle (in Degrees)

Field=Normal Component of Magnetic Field (in mT)

where TIA≦139 Deg

Figure 6:
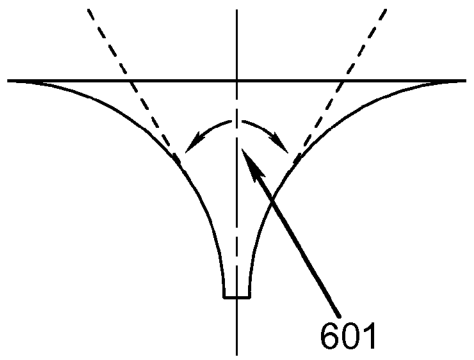
FIG. 6: Depiction of total included angle of inter slot web.

The total included angle 601 is measured rail to rail as shown in FIG. 6 which illustrates a top view of a single inter slot web.

In general, slots that use a trapezoidal geometry for the inter slot web can partially satisfy the requirements of returning carrier back into the developer station, minimizing carrier buildup on the outside vertical face of the scavenger electrode, and increasing overall stiffness of the scavenger as compared to an inter slot web having a constant thickness.

Figure 7:
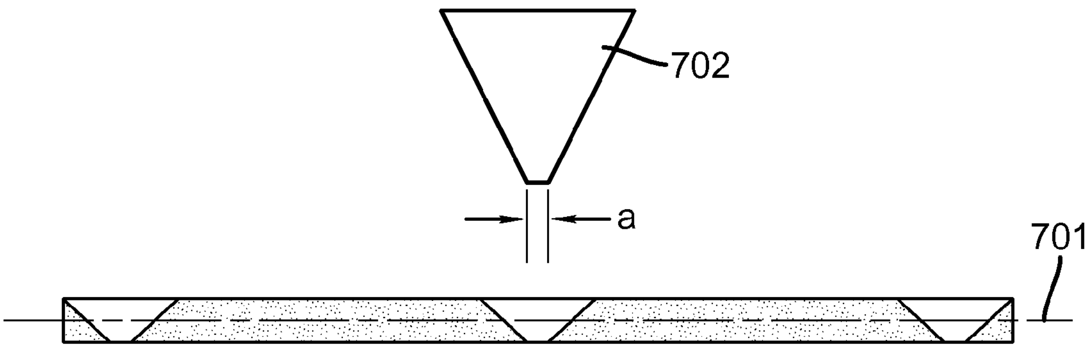
FIG. 7: Specification for inter web slots of a trapezoidal design.

The requirements for the trapezoidal geometry of the inter slot web are described as follows and are shown in the top view of the scavenger electrode depicted in FIG. 7. The 'a' dimension of the trapezoid 702 faces the outside vertical face of the scavenger electrode. The length of the 'a' dimension is preferably less than or equal to about 1.5 mm. The total calculated moment of inertia about the specified axis of interest 701, as illustrated in FIG. 7 for the inter slot web should be about 58 mm^4. The total included angle of the inter slot web geometry provided by the trapezoidal inter slot web should partially satisfy requirements for allowing a return of built up carrier to the developer station.

Figure 8:
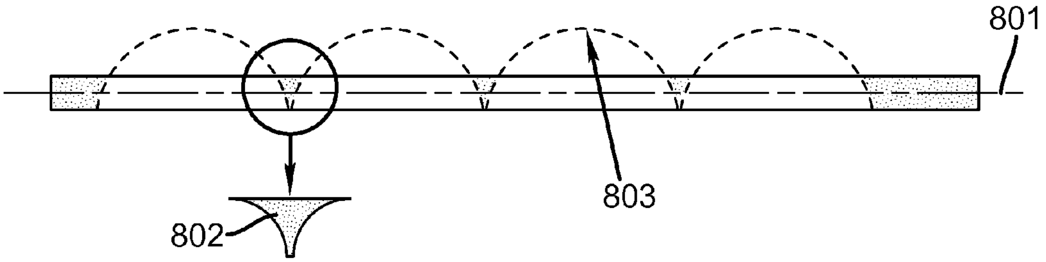
FIG. 8: Top view of scavenger electrode showing slot geometry.
Figure 9:
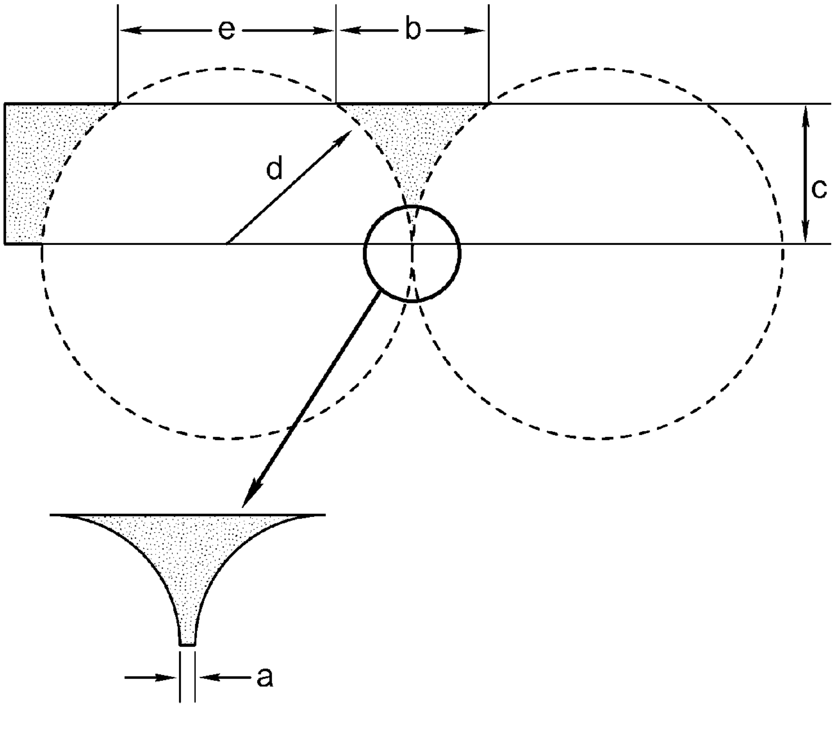
FIG. 9: Specification drawing for slots of a cycloidal design.

Another preferred embodiment of the inter slot web is to cut or form openings in a fashion that describes a cycloid (cusp at origin) such as illustrated in FIG. 6, depicted in greater detail in FIGS. 8 and 9, with the addition of the following.

The profile of the inter slot web is thinner than the equivalent trapezoidal inter slot web towards the outside vertical face of the scavenger electrode, which further discourages carrier buildup on the outside face of the scavenger electrode because the favorable cycloidal geometry presents less resistance to the carrier when it is drawn through the slots by magnetic force from the development roller. This can be seen by comparing FIG. 7 with FIG. 8 where the cycloid inter slot web 802 is thinner in the trapezoidal inter slot web 702 "a" dimension. The cycloidal slots 803 are defined by the following dimensions, with reference to FIG. 9 which shows a top view of the scavenger electrode:

In an experimental laboratory construction, the following dimensions were found to provide improved scavenger performance. The 'a' dimension is of the apex of the inter slot web that faces the outside vertical edge of the scavenger electrode. The length of the 'a' dimension should be less than or equal to about 1.5 mm, but within a range of about 1-2 mm. The 'b' dimension should be about 49.2 mm, but within a range of about 47-52 mm; the 'c' dimension should be about 4.78 mm, but within a range of abut 3-6 mm; and the 'd' dimension should be about 50.8 mm, but within about 47-53 mm. Slot height can range from about 3 mm to about 6 mm (36% to 61%) of the vertical face of the scavenger electrode (approx. 9 mm vertical wall height). Slot width (dimension 'e') ranges from about 20-30 mm. Total slot area should be about 20%-30% of the total area of the vertical face of the scavenger. The total calculated moment of inertia about the specified axis of interest 801 for the inter slot should be about 58 mm^4, as depicted in FIG. 8. The dimensions just described were measured for a scavenger electrode manufactured for a printer having a size of approximately 454 mm in length. The length of the scavenger is consistent with the maximum imaging width of the particular print process, and should not be considered as required dimensions for implementations in any other printer.

Figure 10:
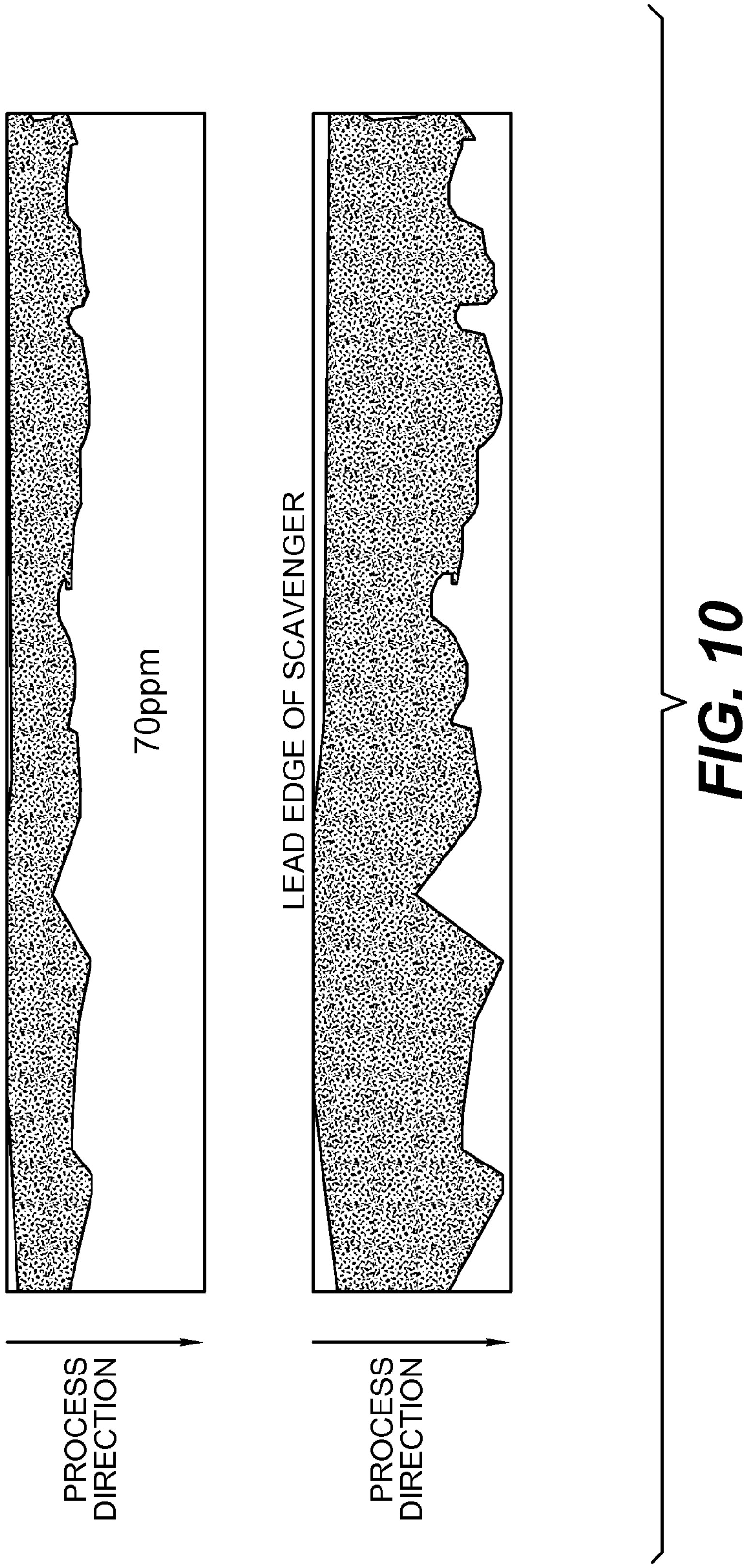
FIG. 10: Depiction of how carrier covers a greater area of the electrode surface when process speed is increased.

In a two component development system, some loss of carrier is inevitable, and management of carrier loss turns out to be a very important part of the development station design. Specifically, the need to effectively scavenge escaping carrier and return it back to the development station is crucial to the overall life of the developer. It has been shown that as the speed of the electrostatographic process is increased, the trajectory of the carrier is such that it landed farther downstream from the developer station resulting in increased build up, as depicted in FIG. 10, which depicts build up amounts for print speeds of 70 ppm and 100 ppm (pages per minute).

It is essential to place the scavenger electrode at the point where the influence of the developer station magnet is such that it could no longer urge the carrier back into the developer station. As the speed of the process continues to increase, the trajectory of the carrier is such that a large portion of the scavenged carrier lands far past the trail edge of the scavenger electrode. This results in carrier accumulating on the scavenger and associated mounting surfaces, and results in increased maintenance and eventual degradation in image quality. The mass of escaping carrier is such that a simple strategy of placing a tray downstream of the developer station to catch and collect the carrier is unmanageable, since it is not guaranteed that escaping carrier caught in the external tray would be returned to the developer station. A practical solution requires that the majority of this escaping carrier be returned back to the developer station.

Figure 11:
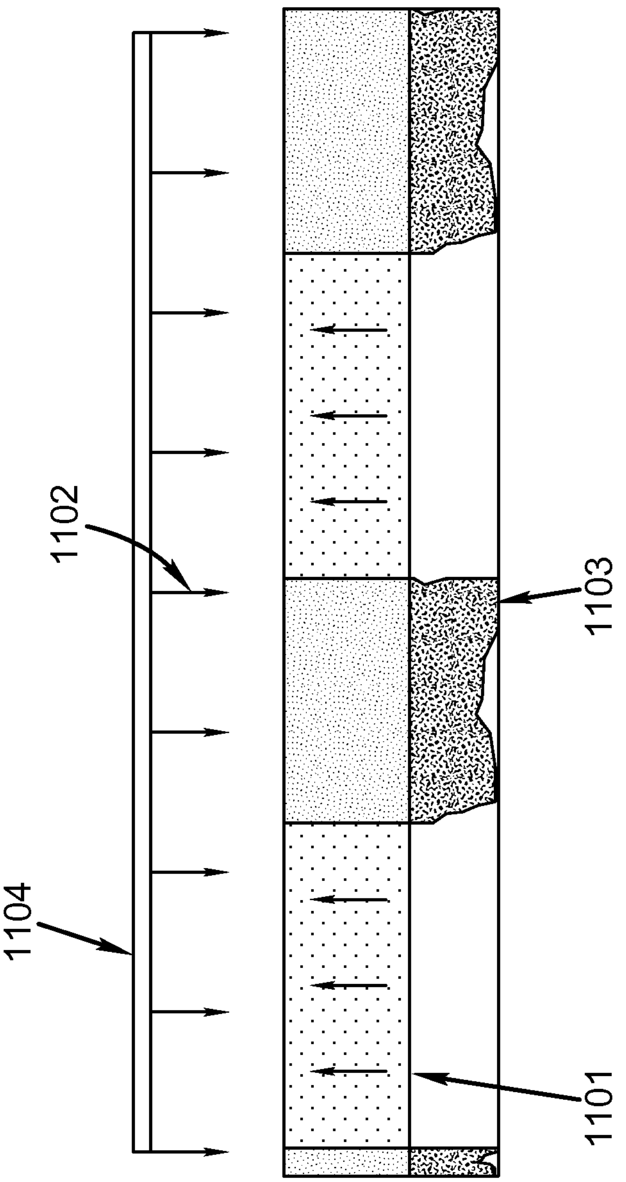
FIG. 11: Depiction of carrier buildup on inter slot webs.

Initial attempts at a solution involved drilling holes and cutting slots into the vertical face of the scavenger electrode. This resulted in a vast majority of the carrier returning back to the developer station. This design was not completely effective, because the inter slot web areas accumulated carrier to the point where it would make contact with the imaging member surface, causing an image defect. With reference to FIG. 11, this geometry for the inter slot web was ineffective because the magnetic field 1102 is normal to the vertical surface of the scavenger, such that there is no force to urge the carrier 1103 to move in the transverse direction (along the face of the scavenger electrode). The carrier is urged in the direction 1101 through the slot by the magnetic field. Thus, the carrier is held tight on the horizontal face of the inter slot web, as depicted in FIG. 11.

Figure 12:
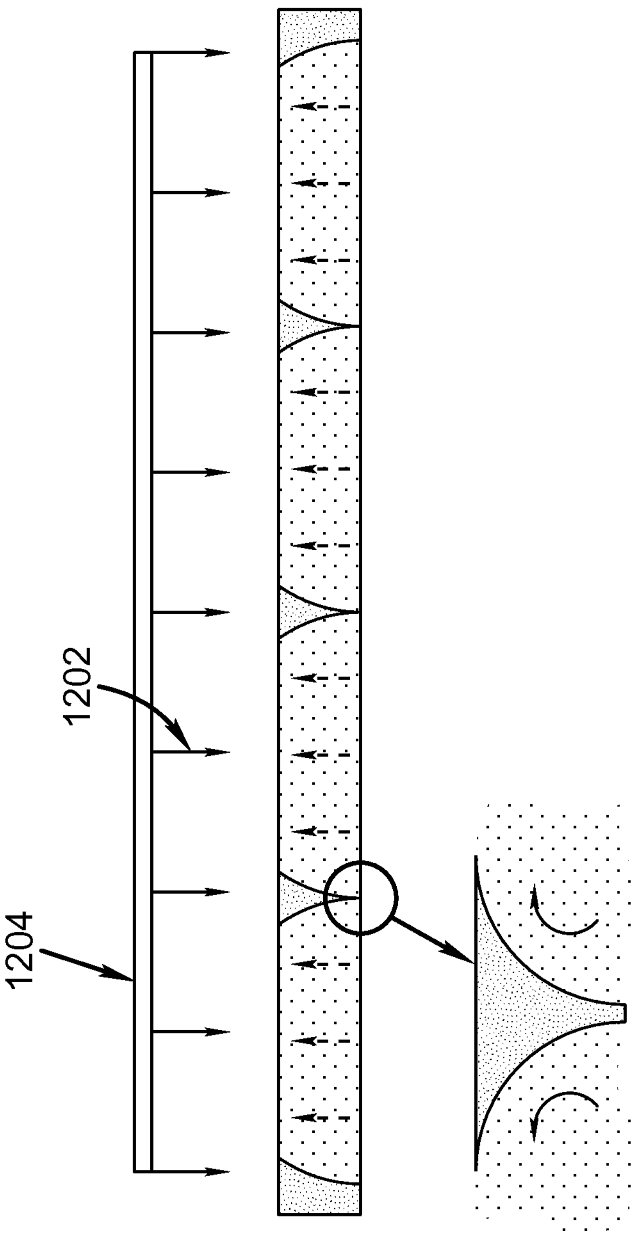
FIG. 12: Depiction of improved geometry.

With reference to FIG. 12, the addition of the cycloidal inter slot web urges the carrier in transverse direction (along the length of the cycloidal inter slot web) and through the openings, allowing for the proper return of carrier back into the development station. The angle of the inter slot web increases and approaches an angle normal to the magnetic field 1202 where the magnetic field is stronger and able to overcome this increased resistance. Where the magnetic field is weaker, near the apex of the inter slot web, the inter slot web geometry is almost parallel to the magnetic field lines and provides very little resistance to the movement of the carrier. This geometry also preserves the required rigidity and stiffness of the scavenger electrode over other web geometries. In particular, the wider profile of the inter slot web on the inside surface of the scavenger provides this increased rigidity. With the geometry described by the present invention, this buildup is substantially eliminated.

With reference to FIG. 9, a method of fabricating, cutting, forming, or manufacturing the slotted, planar, scavenger will now be described. FIG. 9 illustrates a top view of the scavenger. The scavenger is typically cut from a sheet of aluminum. Important characteristics of the scavenger material include low magnetic permeability, so as not to induce eddy currents with the rotating magnet nearby and sufficient rigidity as to be able to be machined and hold the proper tolerances for the parts, and a width selected to fit in a particular printer. Stainless steel is an option but is not preferred. While having low permeability, stainless steel is expensive and hard to machine. Plastic, while easy to machine, is not as rigid and must have an added conductive coating to the electrode surface.

The edges of the sheet can be distinguished from the two opposite major surfaces of the sheet, also referred to as predominant flat surfaces. The slots may be fabricated prior to separating the scavenger from the supply sheet, or afterwards, and are formed through the two major surfaces. A rotating, or other, tool for cutting, grinding, milling, melting, or abrading is brought into contact with the scavenger moving from the bottom, which is the outside surface as defined herein, towards the top, as viewed in FIG. 9. The tool will penetrate a major surface of the scavenger plate through thickness "c" and emerge at the top major surface, as viewed in FIG. 9, or the inside surface as defined herein when the scavenger is in use in the printer, thereby forming a slot, opening, aperture, hole, or slit of width "e". The thickness of the cutting tool preferably is equivalent to the desired height of the slots as defined herein, so that the tool is applied during one operation upon the scavenger plate for each slot that is fabricated, or a thinner tool may be applied repeatedly to increase a height of the slot with each repeated application. A single rotating head can be applied multiple times to form multiple slots in the scavenger plate, or a tool having multiple rotating heads can also be applied, thereby requiring fewer fabrication steps. The particular material selected for the scavenger plate may be more compatible with particular materials used as cutting tools. In a preferred embodiment of the present invention. Using the preferred dimensions of the slots and the inter slot web as described and defined herein, it is a matter of practical art to apply the rotating cutting tools for fabricating the preferred scavenger structure illustrated herein. The rotating tool can be a grinding wheel, circular saw, or similar milling tool.

An alternative embodiment for fabricating the slotted scavenger includes forming the slotted opening or openings using other techniques known in the art while using the rotating or cutting tools described above to form a cycloid or trapezoidal inter slot web. Thus, in this alternative embodiment, the slots through the scavenger are formed prior to shaping the inter slot web. If the slots are punched through the scavenger and have a height, say, of dimension x, then a rotating or cutting tool as described above having a thickness x can be applied to the same scavenger surface as described above to shape the inter slot web as described above, except that the slot is already formed and the rotating tool merely shapes the inter slot web as a cycloid or trapezoid. Alternatively, the thickness of the cutting tool can be less than a height of the slot so long as the inter slot web is shaped by the cutting tool coplanar with a bottom surface of the slot. This is applicable to an embodiment wherein the slot is formed at an angle normal to a major surface of the scavenger or whether the slot is angled as shown in FIG. 4B. The angle of the slot can vary between a normal direction (0°) and approximately 45° from normal.

It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention. Accordingly, the scope of protection of this invention is limited only by the following claims and their equivalents.

The invention claimed is:

1. A method of making a slotted scavenger comprising:

providing a rigid sheet having a thickness connecting first and second major surfaces of the sheet;

rotating a discoid cutting tool for cutting through the rigid sheet; and forming a first slot in the rigid sheet by applying a force to the rotating cutting tool normal to the first major surface of the rigid sheet so that a circumferential edge of the cutting tool penetrates the second major surface of the rigid sheet to form an opening in the second major surface of the sheet and an opening in the first major surface of the sheet, such that the opening in the first major surface is smaller than the opening in the second major surface.

2. The method of claim 1 wherein the sheet comprises a material selected from the group consisting of aluminum and stainless steel.

3. The method of claim 1 wherein the sheet comprises a material having a thickness of at least about 3 mm.

4. The method of claim 1 wherein an axis of rotation of the cutting tool is parallel to the sheet.

5. The method of claim 1, further comprising the steps of forming a second slot in the rigid sheet by applying a force to the rotating cutting tool normal to the first major surface of the rigid sheet so that a circumferential edge of the cutting tool penetrates the first major surface of the rigid sheet at a location spaced from the first slot in order to penetrate the rigid sheet and form a further opening in the second major surface of the sheet and a further opening in the first major surface of the sheet, wherein the slots are separated by an inter slot web having a cycloidal cross section.

6. A method of making a scavenger comprising:
- providing a rigid sheet having a thickness connecting first and second major surfaces of the sheet;
- rotating a discoid cutting tool for cutting through the rigid sheet; and
- forming a first slot in the rigid sheet by applying a force to the rotating cutting tool at a right angle to the first major surface of the rigid sheet so that a circumferential edge of the cutting tool penetrates the second major surface of the rigid sheet to form an opening in a second major surface of the sheet and an opening in the first major surface of the sheet, such that the opening in the first major surface is smaller than the opening in the second major surface.

7. The method of claim 6 wherein the sheet comprises a material selected from the group consisting of aluminum and stainless steel.

8. The method of claim 6 wherein the sheet comprises a material having a thickness of at least about 3 mm.

9. The method of claim 6 wherein an axis of rotation of the cutting tool is from 0° and 45° from an axis that is parallel to the major surfaces of the sheet.

10. The method of claim 6 further comprising the steps of forming a second slot in the rigid sheet by applying a force to the rotating cutting tool so that a circumferential edge of the cutting tool penetrates the first major surface of the rigid sheet at a location spaced from the first slot in order to penetrate the rigid sheet and form a further opening in the second major surface of the sheet and a further opening in the first major surface of the sheet, wherein the slots are separated by an inter slot web having a cycloidal cross section.

11. A method of making a slotted scavenger comprising:
- providing a rigid sheet having a thickness connecting first and second major surfaces of the sheet; and
- forming a slot through the sheet first and second major surfaces of the sheet by applying a cutting force to a rotating discoid cutting tool such that a circumferential edge of the cutting tool penetrates through the thickness of the rigid sheet by penetrating through the first and second major surfaces of the rigid sheet to form openings in the first and second major surfaces such that the slot has sidewalls extending through the thickness that are angled with respect to the first and second major surfaces such that the opening of the slot on the first major surface of the sheet is smaller than the opening of the slot in the second major surface of the sheet.

12. The method of claim 11 wherein the sheet comprises a material selected from the group consisting of aluminum and stainless steel.

13. The method of claim 11 wherein the sheet comprises a material having a thickness of at least about 3 mm.

14. The method of claim 11 further comprising the step of forming a second slot through the sheet having angled sidewalls such that an opening of the second slot on the first major surface of the sheet is smaller than an opening of the second slot in the second major surface of the sheet.

15. The method of claim 14 wherein the slots are separated by an inter slot web having a cycloidal cross section.

* * * * *